UNITED STATES PATENT OFFICE.

CHARLES N. WAITE, OF MEDFORD, MASSACHUSETTS.

SOLDERING-FLUID.

SPECIFICATION forming part of Letters Patent No. 325,579, dated September 1, 1885.

Application filed September 1, 1884. (No specimens.)

*To all whom it may concern:*

Be it known that I, CHARLES N. WAITE, of Medford, in the county of Middlesex and State of Massachusetts, have invented certain Improvements in Soldering-Fluids, of which the following is a specification.

This invention has for its object to provide an improved soldering-fluid for use in cleaning the surfaces of metal parts which are to be united by solder to enable the solder to make a complete contact with said parts. Heretofore chloride of zinc has been used for this purpose; but as this material is poisonous its use on metals which are to be made into cans for preserving articles of food is highly objectionable, because it is liable to be applied to portions of the surfaces of the metal parts not covered by the solder, so that it will be in contact with and affect the contents of the can.

My invention consists in a soldering-fluid composed of glycerine and lactic acid. I find that this mixture flows rapidly over metal surfaces to which it is applied, effectually cleans such surfaces from rust and other obstacles to the adhesion of the solder, and enables the solder to make thorough contact with the metal.

Glycerine alone, while it operates satisfactorily in cleansing metal surfaces, does not flow with sufficient rapidity to make its use as a soldering-fluid practicable. The addition of lactic acid overcomes this difficulty.

In preparing my improved fluid I mix equal parts of glycerine and lactic acid.

I am aware that tallow, a chemical compound composed of stearic acid and glycerine, is sometimes used as a flux on surfaces which are highly heated. It is found that in actual practice oleaginous matter, like tallow, does not act as a flux unless the surfaces are highly heated, as in brazing, but, on the other hand, prevents the union of solder with cold metal surfaces. This is well known to canners of fish, the oil in which prevents the union of the surfaces unless a powerful flux is used.

The fluid composed of glycerine and lactic acid is a mechanical fluid mixture, not a compound, the useful properties of each part being retained—viz., the cleaning properties of the glycerine and the solvent properties of the lactic acid—whereby the mixture is caused to flow freely.

Acetic acid and the mineral acids—as muriatic, nitric, &c.—when used as a flux act to dissolve the metal to which they are applied, converting a portion of the metal into an ash or powder, which is left upon the surface, giving it an unclean appearance. Lactic acid mixed with glycerine has no such effect.

I claim—

A soldering-fluid composed of glycerine and lactic acid, as set forth.

In testimony whereof I have signed my name to this specification, in the presence of two subscribing witnesses, this 27th day of May, 1884.

CHARLES N. WAITE.

Witnesses:
C. F. BROWN,
A. L. WHITE.